US009667151B2

(12) United States Patent
Lu et al.

(10) Patent No.: US 9,667,151 B2
(45) Date of Patent: May 30, 2017

(54) INTEGRATED MAGNETIC COMPONENT AND CONVERTER USING THE SAME

(71) Applicant: Delta Electronics (Shanghai) Co., Ltd., Shanghai (CN)

(72) Inventors: Zeng-Yi Lu, Shanghai (CN); Hai-Jun Yang, Shanghai (CN); Jin-Fa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 350 days.

(21) Appl. No.: 14/483,168

(22) Filed: Sep. 11, 2014

(65) Prior Publication Data

US 2015/0155089 A1 Jun. 4, 2015

(30) Foreign Application Priority Data

Dec. 4, 2013 (CN) .......................... 2013 1 0647643

(51) Int. Cl.

| | |
|---|---|
| ***H01F 27/40*** | (2006.01) |
| ***H02M 3/335*** | (2006.01) |
| ***H01F 27/38*** | (2006.01) |
| *H01F 27/28* | (2006.01) |
| *H02M 3/28* | (2006.01) |
| *H02M 1/00* | (2006.01) |

(52) U.S. Cl.

CPC ............ *H02M 3/335* (2013.01); *H01F 27/38* (2013.01); *H01F 27/40* (2013.01);

(Continued)

(58) Field of Classification Search

CPC .... H02M 1/08; H02M 7/1552; H02M 7/1557; H02M 7/1623; H02M 7/1626;

(Continued)

(56) References Cited

U.S. PATENT DOCUMENTS 4,902,942 A * 2/1990 El-Hamamsy .......... H01F 29/14 315/276

8,564,394 B2 10/2013 Li et al.

(Continued)

FOREIGN PATENT DOCUMENTS

| | | |
|---|---|---|
| CN | 1413351 A | 4/2003 |
| CN | 1728298 A | 2/2006 |

(Continued)

*Primary Examiner* — Harry Behm
*Assistant Examiner* — Bryan R Perez
(74) *Attorney, Agent, or Firm* — CKC & Partners Co., Ltd.

(57) ABSTRACT

An integrated magnetic component includes a magnetic core and a plurality of windings. The magnetic core includes at least four magnetic columns. The windings include a primary winding, a first secondary winding, a second secondary winding, and an inductor winding. The primary winding, the first secondary winding and the second secondary winding are wound on one of the magnetic columns. The inductor winding is wound on another magnetic column, and the inductor winding is coupled to the connection where the first secondary winding and the second secondary winding couple to each other. By integrating a transformer and a filter inductor into the integrated magnetic component, the number of the magnetic components, the overall volume, and the weight may be reduced while the mechanical properties may be promoted and the loss of the component connections may be reduced.

26 Claims, 9 Drawing Sheets

(52) U.S. Cl.
CPC ........... *H01F 27/2866* (2013.01); *H02M 3/28* (2013.01); *H02M 2001/0064* (2013.01)

(58) Field of Classification Search
CPC .............. H02M 7/219; H01F 2003/005; H01F 2003/106; H01F 3/04; H01F 3/00; H01F 3/02; H01F 38/28; H01F 38/20; H01F 2017/0026; H01F 2017/065; H01F 17/0013; H01F 17/06; H01F 17/04; H01F 17/00; H01F 17/0006; H01F 17/062; H01F 17/043; H01F 17/045; H01F 2017/0046; H01F 2017/067; H01F 27/28; H01F 27/289; H01F 27/2804; H01F 27/24; H01F 27/255; H01F 27/26; H01F 27/2455; H01F 27/25; H01F 27/245; H01F 27/263; H01F 27/266
USPC ......................... 336/200, 170–173, 210–215
See application file for complete search history.

(56) References Cited

U.S. PATENT DOCUMENTS

2012/0062207 A1* 3/2012 Ikriannikov ........... H01F 38/08 323/361
2012/0062349 A1* 3/2012 Nagano .................. H01F 30/10 336/212
2012/0201053 A1* 8/2012 Lu ............................ H01F 3/14 363/17
2012/0212314 A1* 8/2012 Li ....................... H05K 7/1432 336/192
2014/0192560 A1* 7/2014 Ou ......................... H02M 1/40 363/16
2015/0131329 A1* 5/2015 Chen ...................... H02M 1/08 363/17

FOREIGN PATENT DOCUMENTS

CN 101221850 A 7/2008
CN 101308724 A 11/2008
CN 101315829 A 12/2008
CN 101373658 A 2/2009
CN 101404454 A 4/2009
CN 201266888 Y 7/2009
CN 201503755 U 6/2010
CN 102064699 A 5/2011
JP S59-194573 A 11/1984
JP 2010-50160 A 3/2010
JP 2011-77328 A 4/2011
JP 2011-82205 A 4/2011
TW 200304721 A 10/2003

* cited by examiner

INTEGRATED MAGNETIC COMPONENT AND CONVERTER USING THE SAME

RELATED APPLICATIONS

This application claims priority to Chinese Application Serial Number 201310647643.0, filed Dec. 4, 2013, which is herein incorporated by reference.

BACKGROUND

Field of Invention

The present invention relates to a magnetic component. More particularly, the present invention relates to an integrated magnetic component including a transformer and an inductor.

Description of Related Art

A vehicle power supply encounters a variety of harsh environmental conditions, such as high temperature, high humidity, strong vibrations, and ambient temperature fluctuations, due to the fact that the vehicle power supply travels with the vehicle. The power isolation transformer and the output filter inductor are typically the largest and heaviest elements in a power converter. Moreover, the power isolation transformer and the output filter inductor affect power conversion efficiency, electrical properties, and mechanical properties more than other elements in the power converter. The focus of development for vehicle power supplies relates to ways for coping with different complex and harsh environments, reducing the size and number of magnetic components of the power supply, and improving the overall reliability of the power supply.

SUMMARY

In one aspect, one exemplary embodiment of the invention provides an integrated magnetic component which comprises a secondary center-tapped transformer and an output filter inductor. In one aspect, the invention may be helpful for reducing the number of magnetic components as well as the size and weight, promoting the mechanical properties and minimizing the use of the component connections, thereby boosting the power conversion efficiency.

According to an exemplary embodiment of the present invention, an integrated magnetic component is provided. The integrated magnetic component includes a magnetic core and a plurality of windings. The magnetic core includes at least four magnetic columns, and the windings are wound on the magnetic core. The windings include a primary winding, a first secondary winding, a second secondary winding, and an inductor winding. The primary winding, the first secondary winding and the second secondary winding are wound on one magnetic column of the magnetic columns, and an end of the first secondary winding is coupled to an end of the second secondary winding. The inductor winding is wound on another magnetic column of the magnetic columns, wherein an end of the inductor winding is coupled to a connection where the first secondary winding and the second secondary winding couple to each other.

According to another exemplary embodiment of the present invention, a full-wave rectifier converter is provided. The full-wave rectifier converter includes a primary switch unit, a secondary rectifying unit, a filter element and an integrated magnetic component which couples the primary switch unit and the secondary rectifying unit. The integrated magnetic component receives an AC signal from the primary switch unit. The integrated magnetic component includes a magnetic core and a plurality of windings, wherein the magnetic core includes at least four magnetic columns. The windings are wound on the magnetic core, and include a primary winding, a first secondary winding, a second secondary winding and an inductor winding. The primary winding, the first secondary winding, and the second secondary winding are wound on one of the magnetic columns, and an end of the first secondary winding is coupled to an end of the second secondary winding. The inductor winding is wound on another one of the magnetic columns, wherein an end of the inductor winding is coupled to a connection where the first secondary winding and the second secondary winding couple to each other.

By integrating a transformer and a filter inductor into the integrated magnetic component, in one aspect, the number of the magnetic components, and the overall volume and weight may be reduced, while the mechanical properties may be promoted and the loss of the component connections may be reduced. Moreover, in one aspect, as an embodiment, the first secondary winding, the second secondary winding and the inductor winding are formed into an integrated winding, thereby maybe reducing the component connections of the magnetic component and the loss thereof, and maybe reducing the use of AC windings of the air gap fringing field, thereby maybe leading to a more robust and reliable structure.

It is to be understood that both the foregoing general description and the following detailed description are by examples, and are intended to provide further explanation of the invention as claimed.

DETAILED DESCRIPTION

Figure 1:
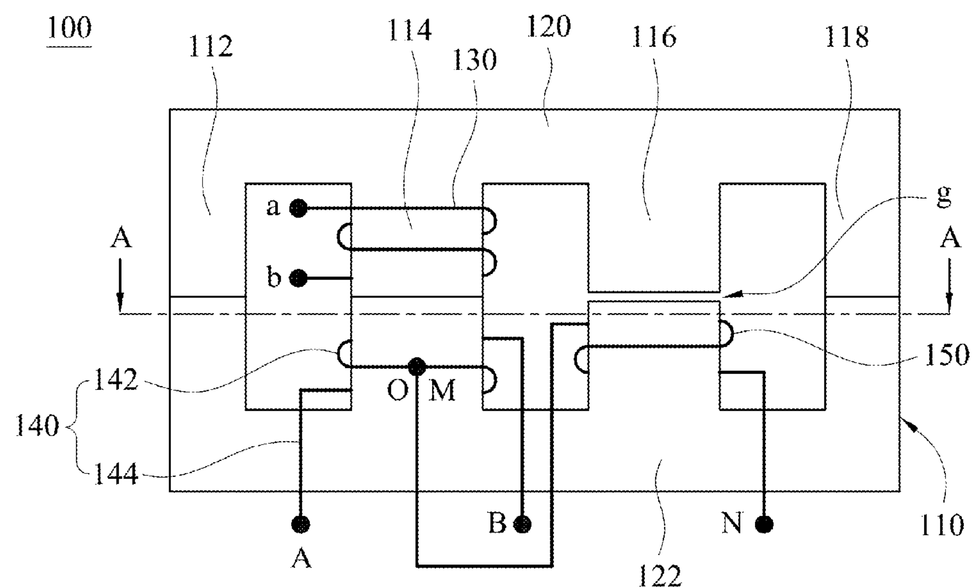
FIG. 1 is a diagram illustrating an integrated magnetic component of an exemplary embodiment of the present invention.

Reference will now be made in detail to the present embodiments of the invention and examples which are illustrated in the accompanying drawings. Wherever possible, the same reference numbers are used in the drawings and the description to refer to the same or like parts. In the following detailed description, for purposes of explanation, details are set forth in order to provide a thorough understanding of the disclosed embodiments. These specific details are not essential to practice one or more embodiments. Besides, well-known structures and devices are schematically depicted in order to simplify the drawings.

Figure 2:
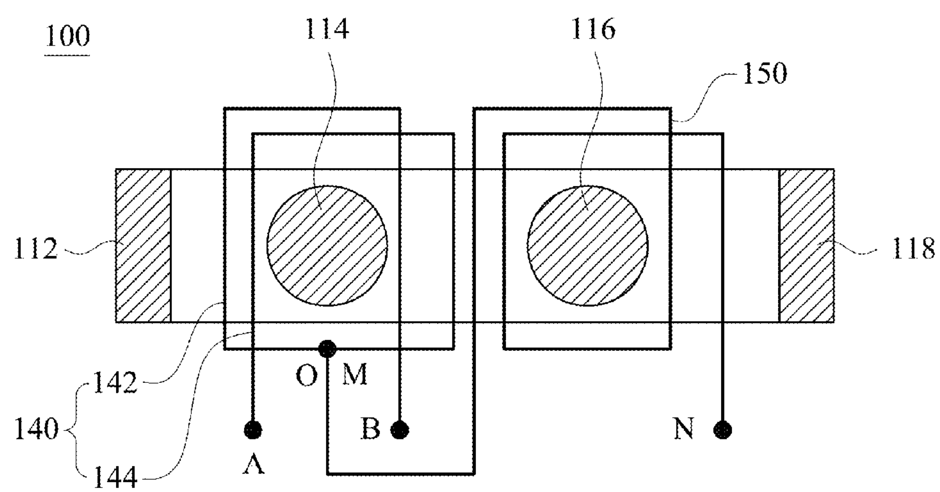
FIG. 2 is a cross-sectional diagram taken along line A-A of FIG. 1 when viewed from above.

Reference is made first to FIG. 1 and FIG. 2. FIG. 1 is a diagram illustrating an integrated magnetic component of an exemplary embodiment of the present invention, and FIG. 2 is a cross-sectional diagram taken along line A-A of FIG. 1 when viewed from above. The integrated magnetic component 100 includes a magnetic core 110 and a plurality windings wound on the magnetic core 110. The magnetic core 110 includes at least four magnetic columns 112, 114, 116, 118, and the magnetic core 110 further includes an upper magnetic cover 120 and a lower magnetic cover 122 for connecting to each of the magnetic columns 112~118. Specifically, the upper magnetic cover 120 is connected to an end of each of the magnetic columns 112~118, and the lower magnetic cover 122 is connected to another end of each of the magnetic columns 112~118, such that the upper magnetic cover 120, the magnetic columns 112~118, and the lower magnetic cover 122 form a closed loop.

The magnetic columns include a first magnetic column 112, a second magnetic column 114, a third magnetic column 116, and a fourth magnetic column 118 arranged in sequence. A primary winding 130 and a secondary winding 140 are wound on the second magnetic column 114 to jointly form the transformer windings. The secondary winding 140 can include a first secondary winding 142 and a second secondary winding 144. The inductor winding 150 is wound on the third magnetic column 116. The first magnetic column 112 and the fourth magnetic column 118 serve as the outside columns.

In order to clearly show the features of the present invention, in this exemplary embodiment and the subsequent exemplary embodiments, by way of example, the first secondary winding 142 is a single-turn winding, the second secondary winding 144 is a single-turn winding, and the inductor winding 150 is a double-turn winding. In practice, the turns of the secondary winding 140 and the inductor winding 150 may vary according to actual design requirements.

The primary winding 130 is wound on the second magnetic column 114, and the primary winding 130 has two outlet ends a, b.

An end of the first secondary winding 142 is coupled to an end of the second secondary winding 144 at a connection O. The first secondary winding 142 has an outlet end B, and the second secondary winding 144 has an outlet end A. The outlet ends A, B and the connection O are positioned on a same side of the magnetic core 110, as shown in FIG. 1 and FIG. 2. In this exemplary embodiment, the outlet ends A, B are positioned on two different sides of the connection O.

The inductor winding 150 is wound on the third magnetic column 116. The inductor winding 150 has two outlet ends M, N, and one outlet end M of the inductor winding 150 is coupled to the connection O of the first secondary winding 142 and the second secondary winding 144. The outlet ends A, B of the secondary winding 140 and the outlet end N of the inductor winding 150 extend in the same direction away from the magnetic core 110, such as towards the bottom side of the magnetic core 110 in FIG. 2.

The transformer may be a secondary center-tapped transformer and the inductor may be an output filter inductor, but the invention is not limited to this. Since the integrated magnetic component 100 integrates a transformer having a center-tapped secondary winding and an output filter inductor into a single component, and disposes the primary winding 130, the first secondary winding 142, the second secondary winding 144 and the inductor winding 150 on the same magnetic core 110, the overall size and weight of the magnetic components of the power supply are reduced.

In addition, since the outlet end M of the inductor winding 150 is coupled to the connection O of the first secondary winding 142 and the second secondary winding 144, such a connection may be viewed as an internal connection. In this way, when the integrated magnetic component 100 is used, to the external circuits, the integrated magnetic component 100 may only have the outlet ends a, b of the primary winding 130, the outlet ends A, B of the secondary winding 140 and the outlet end N of the inductor winding 150, thereby maybe minimizing the number of the winding connections and promoting the reliability of the mechanical connections.

Due to the requirement of inductive energy storage, the third magnetic column 116 on which the inductor winding 150 is wound preferably has an air gap g which serves as an inductive energy storage air gap.

In other exemplary embodiments, the second magnetic column 114 can also optionally have an air gap, and the air gap in the second magnetic column 114 can be used as a transformer gap for energy storage.

Figure 3A:
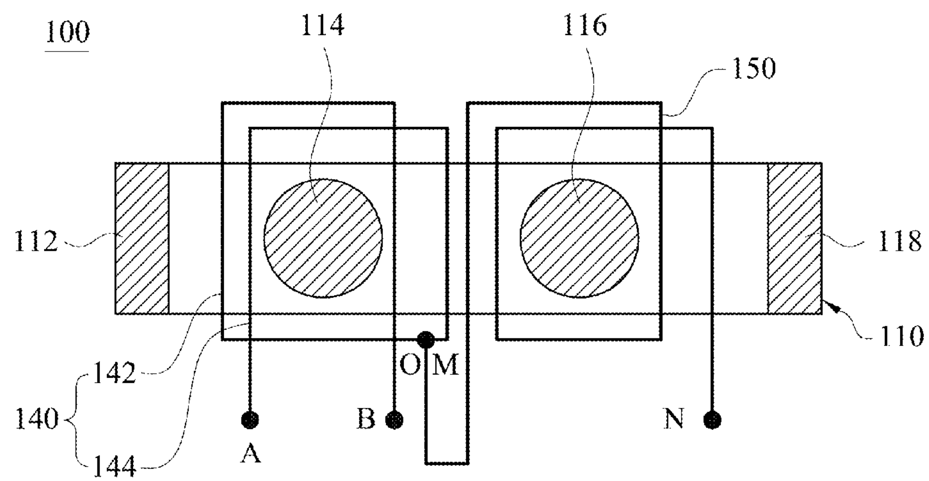
FIG. 3A to FIG. 5 are cross-sectional diagrams of the integrated magnetic component when viewed from above according to different exemplary embodiments of the present invention.
Figure 3B:
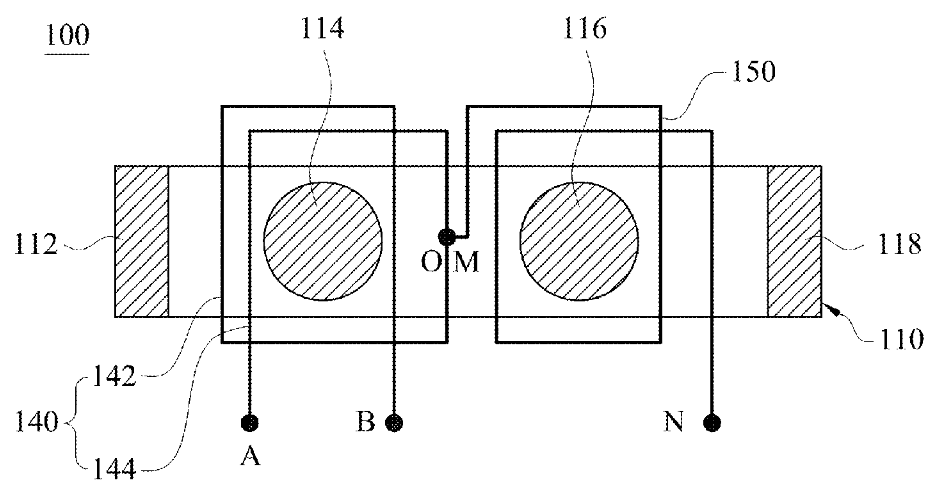

Reference is now made to FIG. 3A and FIG. 3B. FIG. 3A and FIG. 3B are cross-sectional diagrams of the integrated magnetic component when viewed from above according to different exemplary embodiments of the present invention. The cross-sectional positions of FIGS. 3A and 3B are the same as that of FIG. 2. An outlet end M of an inductor winding 150 is also coupled to a connection O of a first secondary winding 142 and a second secondary winding 144. The outlet ends A, B of the secondary winding 140 and the outlet end N of the inductor winding 150 extend in the same direction of the magnetic core 110 (as shown as toward the bottom side in FIG. 3A and FIG. 3B). But the position of the connection O of the inductor winding 150 and the secondary winding 140 is different from the locations of the outlet ends A, B of the secondary winding 140. For example, in FIG. 3A, the outlet ends A, B are positioned on the left side of the connection O, and the connection O, and the outlet ends A, B are all positioned on the same side. Alternatively, as shown in FIG. 3B, the connection O is positioned between the second magnetic column 114 and the third magnetic column 116, and within the magnetic core 110, such as being positioned on an imaginary line interconnecting the second magnetic column 114 and the third magnetic column 116, and not on the same side where the outlet ends A and B are positioned.

Figure 4A:
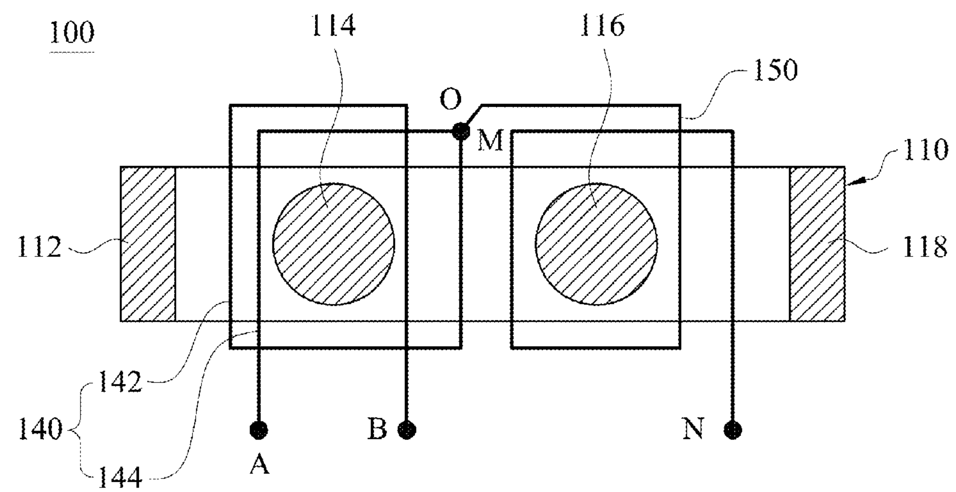
Figure 4B:
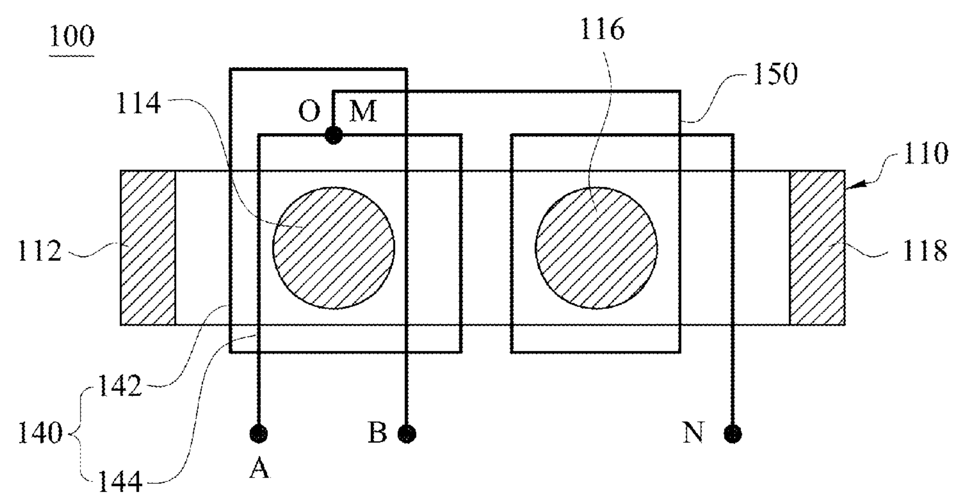

Reference is now made to FIG. 4A and FIG. 4B, FIG. 4A and FIG. 4B are cross-sectional diagrams of the integrated magnetic component when viewed from above according to different exemplary embodiments of the present invention, and the cross-sectional positions of FIGS. 4A and 4B are the same as that of FIG. 2. The outlet end M of the inductor winding 150 is also coupled to the connection O of the first secondary winding 142 and the second secondary winding 144. The connection O to which the outlet end M of the inductor winding 150 and the secondary winding 140 are connected, is positioned between the second magnetic column 114 and the third magnetic column 116. But in this exemplary embodiment, the connection O is not positioned on the same side of the outlet ends A, B of the secondary winding 140 and the outlet end N of the inductor winding 150. For instance, the outlet ends A, B of the secondary winding 140 and the outlet end N of the inductor winding 150 extend in the same direction of the magnetic core 110 (as shown as toward the bottom side in FIG. 4A and FIG. 4B), but the connection O of the inductor winding 150 and the secondary winding 140 is positioned on a different side of the magnetic core 110 as shown as toward the top side. For example, in FIG. 4A, the connection O is positioned on an opposite side of the magnetic core 110 which is between the second magnetic column 114 and the third magnetic column 116. Alternatively, as shown in FIG. 4B, the connection O is positioned on an opposite side of the magnetic core 110 and is positioned on top of the second magnetic column 114.

In the exemplary embodiments as shown in FIG. 4A, and FIG. 4B, the connection O of the inductor winding 150 and the secondary winding 140 is not positioned on the same side of the outlet ends A, B, and N. Compared to the aforementioned exemplary embodiments, the arrangement of this exemplary embodiment may also avoid over-crowding of the windings by spreading the connections of the windings.

Figure 5:
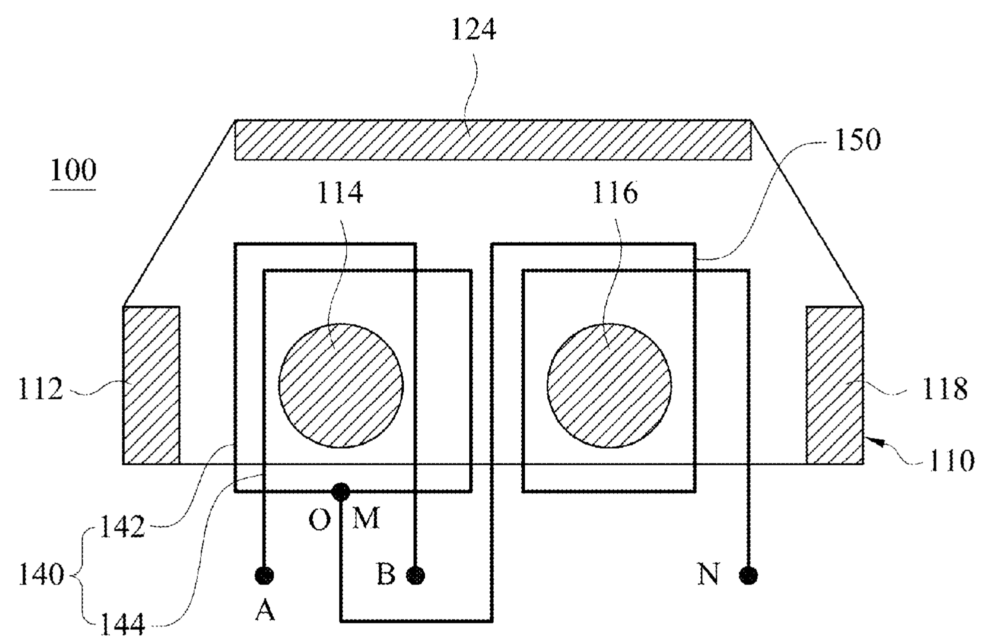

Reference is now made to FIG. 5. FIG. 5 is a cross-sectional view of the integrated magnetic component according to an exemplary embodiment of the present invention when viewed from above, and the cross-sectional position of FIG. 5 is the same as that of FIG. 2. In this exemplary embodiment, the integrated magnetic component 100 includes a fifth magnetic column 124 in addition to a first magnetic column 112, a second magnetic column 114, a third magnetic column 116, and a fourth magnetic column 118 which are arranged in sequence. In other words, the magnetic core 110 includes the first magnetic column 112, the second magnetic column 114, the third magnetic column 116, the fourth magnetic column 118, the fifth magnetic column 124, the upper magnetic cover 120 (as shown in FIG. 1) and the lower magnetic cover 122 (as shown in FIG. 1), and the abovementioned components form a closed magnetic circuit.

A primary winding 130 and a secondary winding 140 are wound on the second magnetic column 114, and the inductor winding 150 is wound on the third magnetic column 116. The fifth magnetic column 124 is positioned between the first magnetic column 112 and the fourth magnetic column 118. The first magnetic column 112, the fourth magnetic column 118, and the fifth magnetic column 124 jointly serve as the outside columns. By providing the fifth magnetic column 124, the magnetic flux of the first magnetic column 112 and of the fourth magnetic column 118 is shared by the fifth magnetic column 124, thus the thickness of the top wall and the bottom wall of the magnetic core 110 may be reduced, thereby maybe providing an integrated magnetic component 100 with a lower height.

In FIG. 5, the secondary winding 140 and the inductor winding 150 couple in the manner illustrated in FIG. 2. However, it is noted that the manner of connection therebetween is for illustrative purposes only and not meant to be a limitation of the present invention, and persons of ordinary skill in the art can alter the connections by referring to the connection configurations disclosed in FIG. 2 to FIG. 4.

In the case where the output current is large, one exemplary embodiment of the present invention further provides a structure in which the secondary winding and the inductor winding are formed to be a part of the integrated magnetic component. Details in this regard are disclosed in the description below.

Figure 6A:
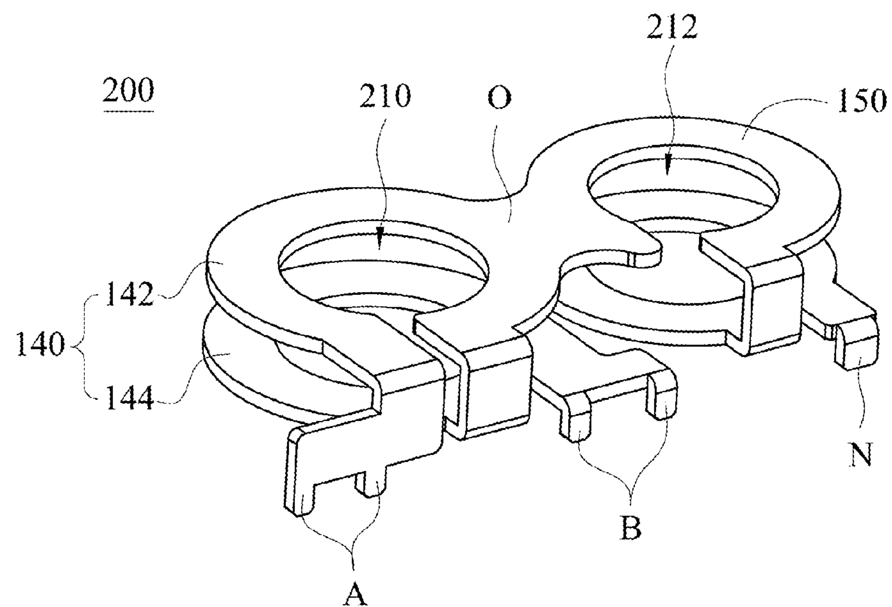
FIG. 6A is a perspective diagram of an integrated element including a secondary winding and an inductor winding of an exemplary embodiment of the present invention in FIG. 4.

Reference is made to FIG. 6A. FIG. 6A is a perspective diagram of an integrated winding including a secondary winding 140 and an inductor winding 150 of an exemplary embodiment of the present invention. The secondary winding 140 and the inductor winding 150 integrally form an integrated winding 200. The integrated winding 200 includes a secondary winding 140 and an inductor winding 150 coupled to each other, and the secondary winding 140 and the inductor winding 150 are displayed as copper rings on a plane. The integrated winding 200 includes a plurality of interconnected copper rings, and two through holes 210, and 212.

The secondary winding 140 includes a first secondary winding 142 and a second secondary winding 144, wherein the first secondary winding 142 and the second secondary winding 144 are single-turn windings. The first secondary winding 142 and the second secondary winding 144 are substantially C-shaped metal sheets. The first secondary winding 142 and the second secondary winding 144 couple through a connection O. The first secondary winding 142 includes an outlet end A, and the second secondary winding 144 includes an outlet end B. The outlet ends A, B can serve as multiple outlet ends.

The inductor winding 150 is a double-turn winding. An end of the inductor winding 150 is coupled to the secondary winding 140, and the inductor winding 150 is also coupled to a connection O of the secondary winding 140. Another end of the inductor winding 150 is an outlet end N. The outlet end N of the inductor winding 150 and the outlet ends A, B of the secondary winding 140 are positioned on a same side of the integrated winding 200, while the connection O of the inductor winding 150 and the secondary winding 140 are positioned on an opposite side of the integrated winding 200.

Figure 6B:
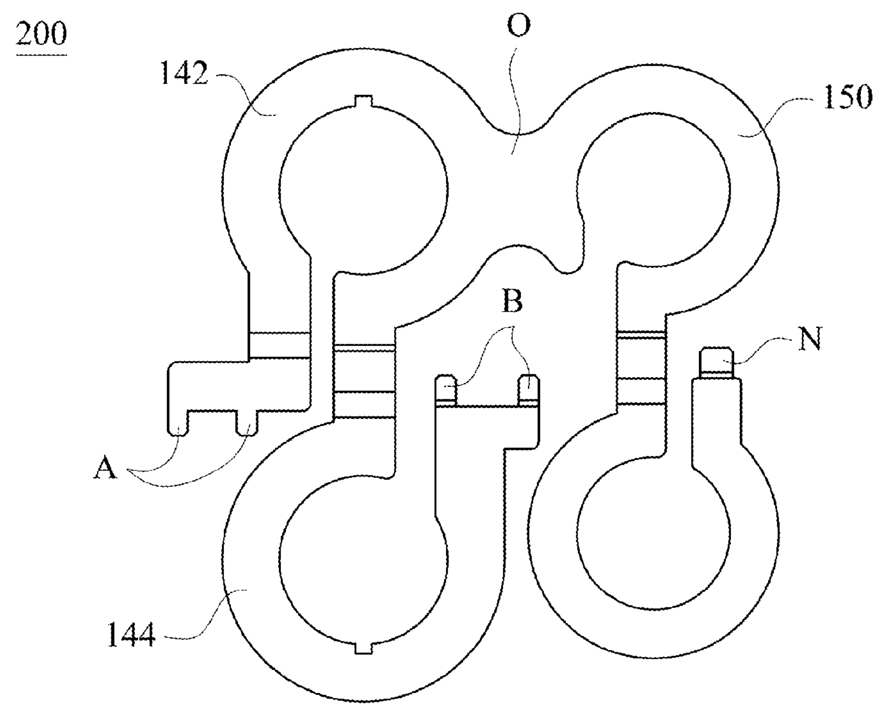
FIG. 6B is a top view of the integrated winding in FIG. 6A, in which the integrated winding is shown in a spread-open state.

In this exemplary embodiments, the secondary winding 140 and the inductor winding 150 are formed of a metal plate, as shown in FIG. 6B. By providing a metal plate stamped according to design requirements, and then bending the metal plate, an integrated winding 200 including the secondary winding 140 and the inductor winding 150 is made.

However, even though in this exemplary embodiment, the integrated winding 200 including the secondary winding 140 and the inductor winding 150 couples in the manner illustrated in FIG. 4, those of ordinary skill in the art can easily form the corresponding integrated winding 200 according to different design requirements, such as designing an integrated winding 200 corresponding to the connections illustrated in FIG. 2 or FIG. 3. The integrated winding which integrates the secondary winding 140 and the inductor winding 150 may be particularly suitable for applications involving large output currents.

Figure 7A:
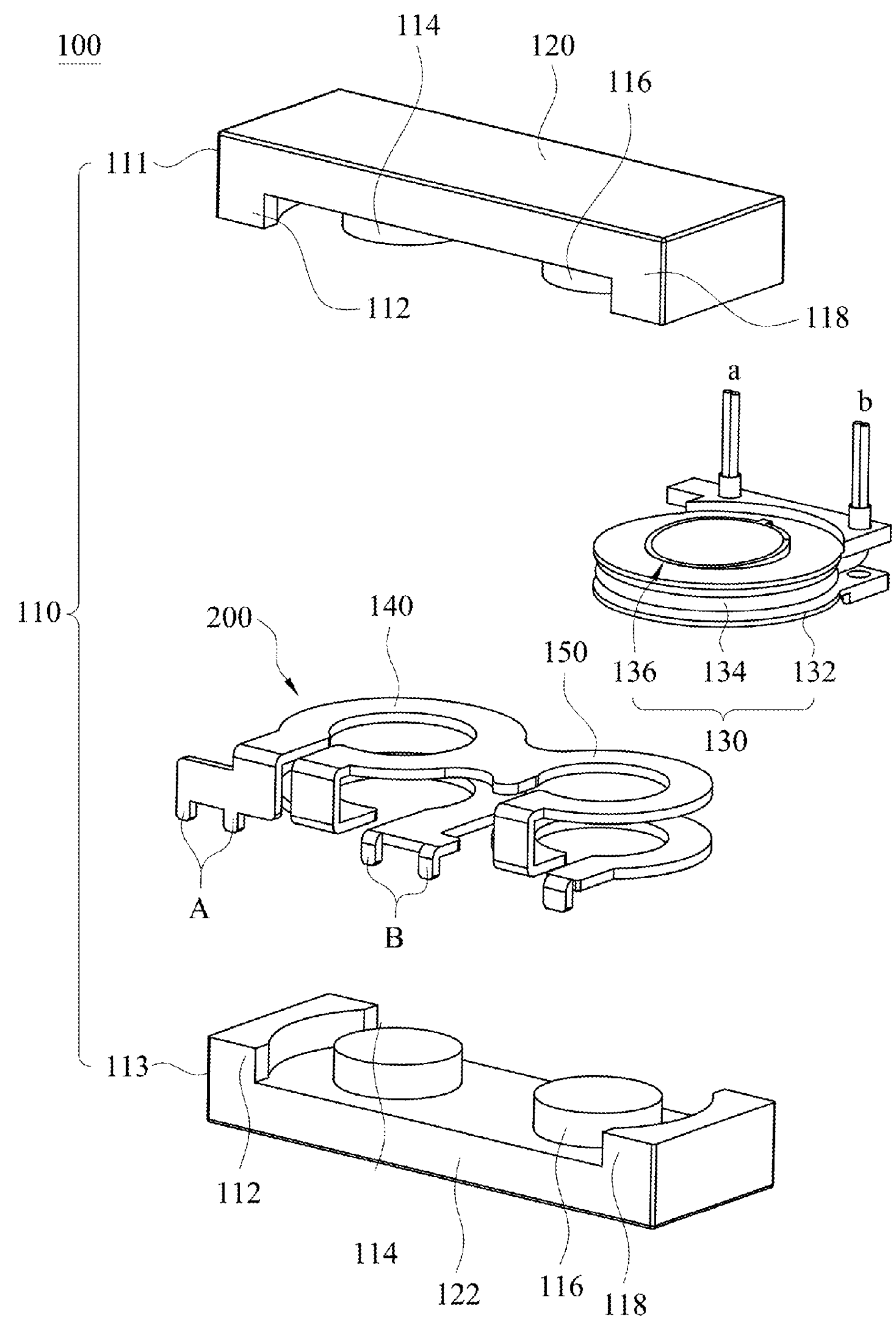
FIG. 7A to FIG. 7C are perspective diagrams of the integrated winding in FIG. 6A at different stages of assembly when the integrated winding is used as an integrated magnetic component.
Figure 7B:
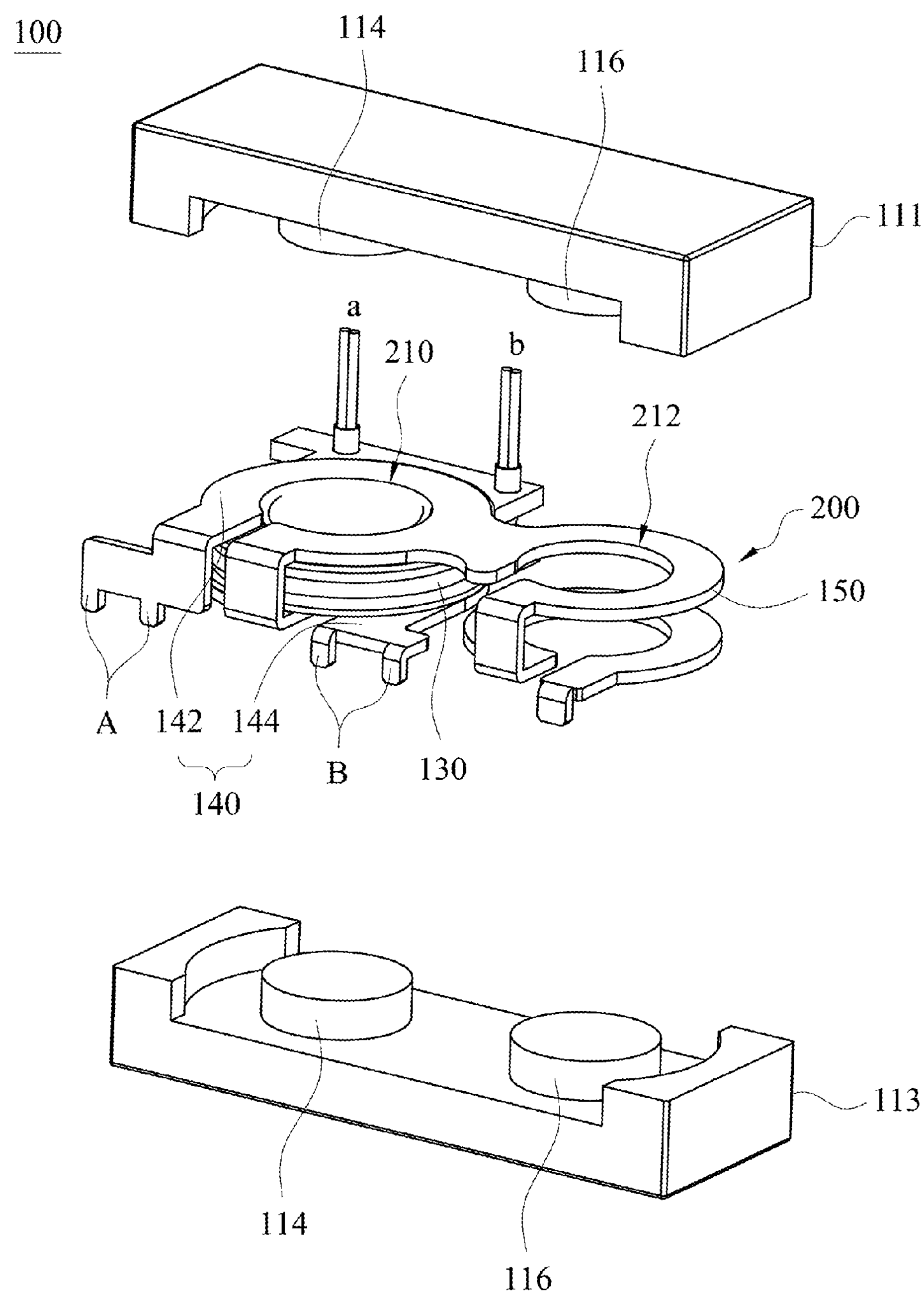
Figure 7C:
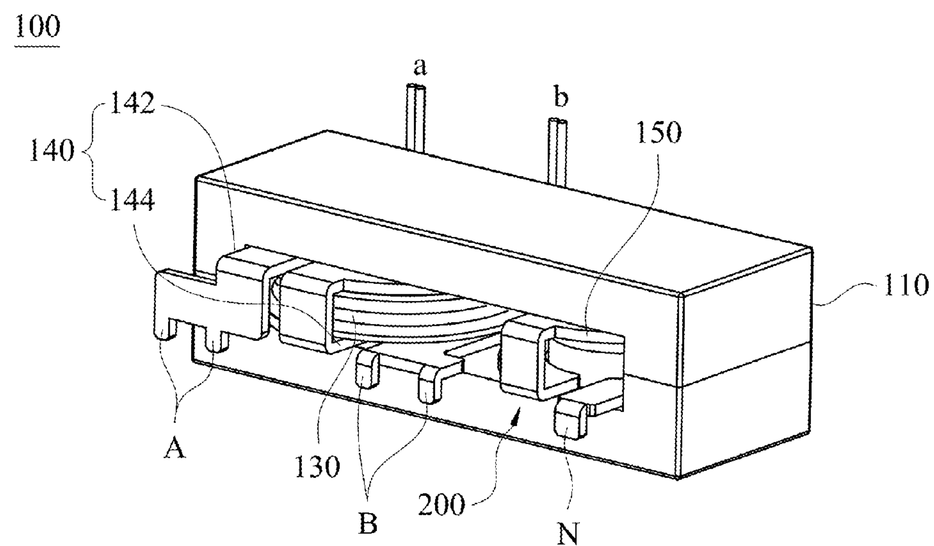

Reference is now made to FIG. 7A to FIG. 7C. FIG. 7A to FIG. 7C are perspective diagrams of the integrated winding in FIG. 6A at different stages of assembly. As shown in FIG. 7A, the integrated magnetic component 100 includes a magnetic core 110, a primary winding 130, and an integrated winding 200 which includes a secondary winding 140 and an inductor winding 150.

The magnetic core 110 can be formed by a top core block 111 and a bottom core block 113. The top core block 111 and the bottom core block 113 are substantially symmetric structures. In this exemplary embodiment, the top core block 111 includes an upper magnetic cover 120 and top sides of the first magnetic column 112, the second magnetic column 114, the third magnetic column 116 and the fourth magnetic column 118; and the bottom core block 113 includes a lower magnetic cover 122 and bottom sides of the first magnetic column 112, the second magnetic column 114, the third magnetic column 116 and the fourth magnetic column 118.

The primary winding 130 includes a bobbin 132 and a coil 134 wound on the bobbin 132. The primary winding 130 includes two outlet ends a, b.

The integrated winding 200 including the secondary winding 140 and the inductor winding 150 has been described above, and a further description of this element is omitted for the sake of brevity.

Next, as shown in FIG. 7B, the primary winding 130 is combined with the integrated winding 200, wherein the primary winding 130 can be positioned between the first secondary winding 142 and the second secondary winding 144, and the outlet ends a, b of the primary winding 130 and the outlet ends A, B of the secondary winding 140 are respectively positioned at the front side and at the rear side.

The integrated winding 200 includes two through holes 210, 212 which are respectively positioned on the secondary winding 140 and the inductor winding 150, wherein at least some part of the through hole 210 positioned on the secondary winding 140 is overlapped with an opening 136 (as shown in FIG. 7A) of the bobbin 132. The through holes 210, 212 of the integrated winding 200 are used to respectively assemble the magnetic columns on which the secondary winding 140 and the inductor winding 150 are wound. Namely, the through hole 210 is for assembling the magnetic column where the secondary winding including the first secondary winding and the second secondary winding are wound on, and the through hole 212 is for assembling the magnetic column where the inductor winding 150 is wound on.

More particularly, when the top core block 111 and bottom core block 113 combine, the top half portion as well as the bottom half portion of the second magnetic column 114 pass through the through hole 210 on the integrated winding 200, so that the primary winding 130 and the secondary winding 140 are wound on the second magnetic columns 114, and the top half portion as well as the bottom half portion of the third magnetic column 116 pass through the other through hole 212 on the integrated winding 200, so that the inductor winding 150 is wound on the third magnetic columns 116.

The assembled integrated magnetic component 100 is illustrated in FIG. 7C. The outlet ends a, b of the primary winding 130 are positioned at the back side of the magnetic core 110, and the outlet ends A, B of the secondary winding 140 and the outlet end N of the inductor winding 150 are positioned at the front side of the magnetic core 110.

Since between the top and the bottom surfaces of the integrated winding 200, such as in one case—between the first secondary winding 142 and the second secondary winding 144, a space for placing the primary winding 130 is retained, the upper and lower copper rings of the inductor winding 150 may be distanced from the inductive storage air gap (as shown in FIG. 1) of the third magnetic column 116 with respect to the inductor winding 150 wound on the third magnetic column 116 (as shown in FIG. 7B), thereby maybe reducing the loss of AC windings due to the air gap fringing field.

The integrated magnetic component 100 may be used in a vehicle power supply. Since a vehicle power supply has to travel with the vehicle, the vehicle power supply encounters a variety of harsh environment conditions, such as high temperatures, high humidity, strong vibrations, ambient temperature fluctuations and other conditions. The integrated magnetic component 100 integrates a full-wave rectifier converter and an output filter inductor into one component. Moreover, the secondary winding 140 of the full-wave rectifier converter and the inductor winding 150 which provides the output filtering function are integrated on the integrated winding 200 and this may thereby be suitable for large current outputs, which is increasingly the trend. In other words, by using the integrated magnetic component 100 in the area of vehicle power supplies, the overall size and the weight of the vehicle power supply may be effectively reduced. Additionally, since the full-wave rectifier converter and the output filter inductor are integrated into a single component, the mechanical strength may be enhanced to be suitable for dramatic changes in the environment while driving.

Figure 8:
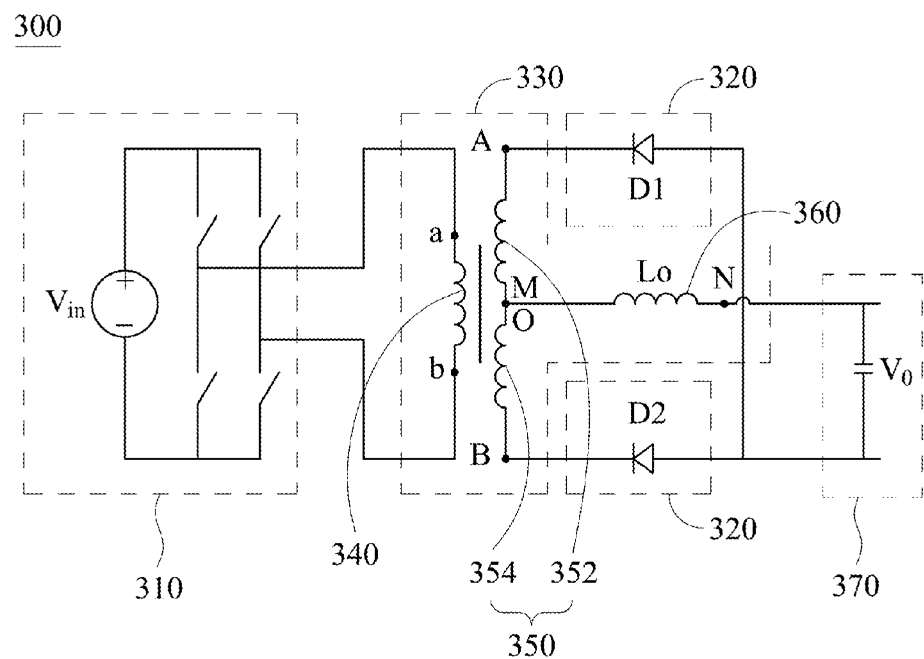
FIG. 8 is a circuit diagram of a full-wave rectifier converter according to an exemplary embodiment of the present invention.

Reference is made to FIG. 8. FIG. 8 is a circuit diagram of a full-wave rectifier converter according to an exemplary embodiment of the present invention. The full-wave rectifier converter 300 includes a primary switch unit 310, a secondary rectifying unit 320, a filter element 370 and an integrated magnetic component 330 which couples the primary switch unit 310 with the secondary rectifying unit 320. The primary switch unit 310 is a full-bridge converter. Since details of the structure of the integrated magnetic component 330 can be understood by referring to any one of the aforementioned exemplary embodiments, a further description of this element is omitted for the sake of brevity.

The integrated magnetic component 330 includes a primary winding 340, a secondary winding 350 and an inductor winding 360. The primary winding 340 and the secondary winding 350 function as a transformer, and an output filtering unit constructed by the inductor winding 360 and the filter element 370 provides a filtering function. The secondary winding 350 includes a first secondary winding 352 and a second secondary winding 354, wherein an end M of the inductor winding 360 is coupled to a connection O of the first secondary winding 352 and the second secondary winding 354, and another end N of the inductor winding 360 is coupled to the filter element 370. The primary winding 340 of the integrated magnetic component 330 is coupled to the primary switch unit 310, and the secondary winding 350 of the integrated magnetic component 330 is coupled to the secondary rectifying unit 320.

Figure 9:
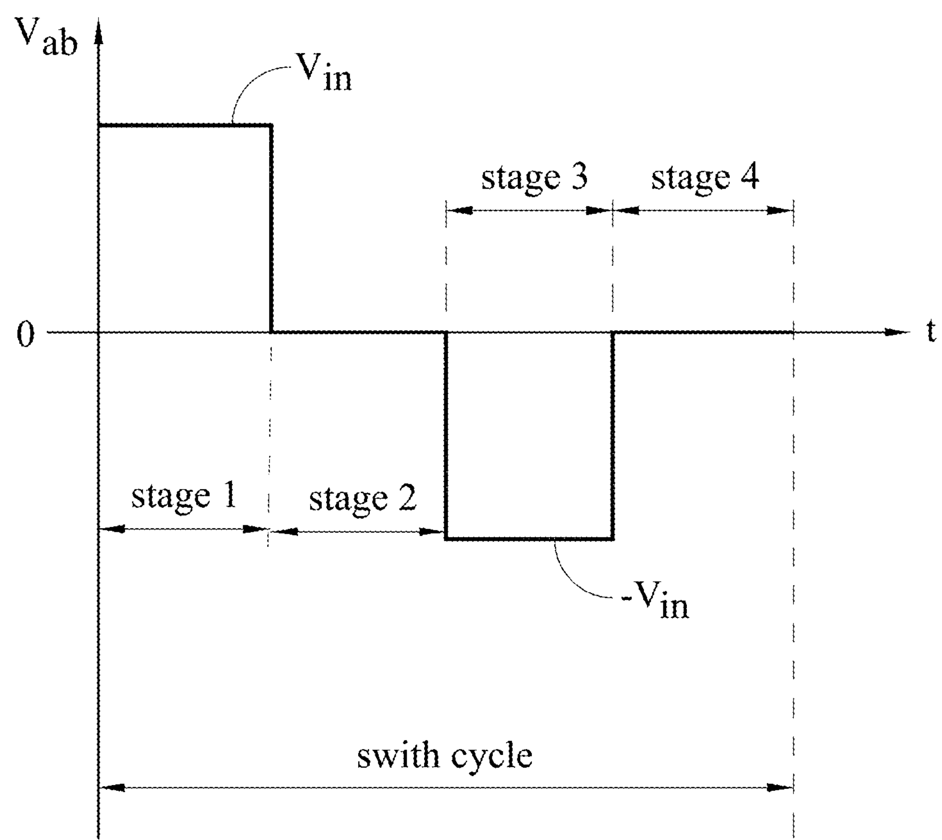
FIG. 9 is a diagram illustrating a symmetrical signal received by two ends a, b of a primary winding of the integrated magnetic component in FIG. 8 in a switch cycle.

The outlet ends a, b of the integrated magnetic component 330 receives an AC signal which is generated by the primary switch unit 310, as shown in FIG. 9. FIG. 9 is a diagram illustrating an AC signal received by the voltage Vab across the two ends a, b of the primary winding in FIG. 8 in a switch cycle. In this embodiment, the voltage Vab, which is a symmetrical signal, is received by the two outlet ends a, b of the integrated magnetic component 330 and includes four stages. In a stage 1, the voltage Vab is equal to an input voltage Vin, that is, Vab=Vin. In a stage 2, the voltage Vab is equal to zero, Vab=0. In a stage 3, Vab=−Vin. In a stage 4, Vab=0. The loop then continues in the next switch cycle. The time that each of the stages 1 to 4 takes is about the same. The symmetrical signal Vab will lead to symmetrical bidirectional magnetization of the transformer, thereby maybe reducing the size and weight of the integrated magnetic component 330. Moreover, the symmetrical signal Vab is rectified and outputted as a full-wave signal via the center-tapped secondary winding 350 and thus contributes to the magnetic integration of the secondary winding 350 and the inductor winding 360. In other embodiments, the voltage Vab received by the two outlet ends a, b of the integrated magnetic component 330 may not be a symmetrical signal. A person of ordinary skilled in the art may flexibly select the voltage type according to real requirements.

The primary switch unit 310 includes at least a combination of a plurality of switch components. The primary switch unit 310 in FIG. 8 is illustrated as a full-bridge converter. However, the primary switch unit 310 can be achieved by using a half-bridge converter or a push-pull converter in other exemplary embodiments of the present invention. The secondary rectifying unit 320 includes a plurality of diodes or a plurality of synchronous rectifiers. In this exemplary embodiment, the output filtering unit is constructed by the inductor winding 360 and the filter element 370, and the filter element 370 includes an output capacitor, but this is not a limitation for invention in this regard. Those of ordinary skill in the art can vary the number and assembly configuration of the inductor winding 360 and the filter element 370 according to various design requirements.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An integrated magnetic component, comprising:

a magnetic core having a first magnetic column, a second magnetic column, a third magnetic column, and a fourth magnetic column arranged in sequence; and a plurality of windings, which are wound on the magnetic core, wherein the plurality of windings comprise a primary winding, a first secondary winding, a second secondary winding, and an inductor winding, wherein:

the primary winding, the first secondary winding and the second secondary winding are wound only on the second magnetic column, and the first secondary winding is coupled to the second secondary winding; and the inductor winding is wound only on the third magnetic column, and an end of the inductor winding is coupled to a connection where the first secondary winding and the second secondary winding couple to each other.

2. The integrated magnetic component of claim 1, wherein the first secondary winding, the second secondary winding, and the inductor winding are formed into an integrated winding.

3. The integrated magnetic component of claim 2, wherein the integrated winding is made of a metal plate.

4. The integrated magnetic component of claim 2, wherein the integrated winding comprises two through holes, in which one of the through holes is for assembling the second magnetic column, and another one of the through holes is for assembling the third magnetic column.

5. The integrated magnetic component of claim 1, wherein the primary winding further comprises a bobbin and a coil which is wound on the bobbin.

6. The integrated magnetic component of claim 5, wherein the bobbin, the first secondary winding and the second secondary winding are positioned on the second magnetic column.

7. The integrated magnetic component of claim 1, wherein each of the first secondary winding and the second secondary winding comprises an outlet end and a connecting end, wherein an end of the inductor winding is coupled to the connecting end of the first secondary winding and the connecting end of the second secondary winding, wherein the connecting ends of the first secondary winding and the second secondary winding are not at the same side where the outlet ends of the first secondary winding and the second secondary winding are positioned.

8. The integrated magnetic component of claim 1, wherein the magnetic columns further comprise a fifth magnetic column.

9. The integrated magnetic component of claim 1, wherein the second magnetic column or the third magnetic column comprises an air gap.

10. The integrated magnetic component of claim 1, wherein the magnetic core further comprises an upper magnetic cover and a lower magnetic cover, wherein the upper magnetic cover, the lower magnetic cover, and the first, second, third and fourth magnetic columns form a closed magnetic circuit.

11. The integrated magnetic component of claim 1, wherein both the first secondary winding and the second secondary winding are single-turn windings, and the inductor winding is a double-turn winding.

12. A full-wave rectifier converter, comprising a primary switch unit, a secondary rectifying unit, a filter element and an integrated magnetic component which couples the primary switch unit and the secondary rectifying unit, wherein the integrated magnetic component receives an AC signal from the primary switch unit, wherein the integrated magnetic component comprises a magnetic core and a plurality of windings, wherein the magnetic core comprises a first magnetic column, a second magnetic column, a third magnetic column, and a fourth magnetic column arranged in sequence, and the windings are wound on the magnetic core, and the windings comprise a primary winding, a first secondary winding, a second secondary winding and an inductor winding, wherein:

the primary winding, the first secondary winding, and the second secondary winding are wound only on the second magnetic column, wherein the first secondary winding is coupled to the second secondary winding; and the inductor winding is wound only on the third magnetic column, wherein an end of the inductor winding is coupled to a connection where the first secondary winding and the second secondary winding couple to each other.

13. The full-wave rectifier converter of claim 12, wherein the first secondary winding, the second secondary winding, and the inductor winding are formed into an integrated winding.

14. The full-wave rectifier converter of claim 13, wherein the integrated winding is made of a metal plate.

15. The full-wave rectifier converter of claim 13, wherein the integrated winding comprises two through holes, in which one of the through holes is for assembling the second magnetic column, and another one of the through holes is for assembling the third magnetic column.

16. The full-wave rectifier converter of claim 12, wherein the primary winding further comprises a bobbin and a coil which is wound on the bobbin.

17. The full-wave rectifier converter of claim 16, wherein the bobbin, the first secondary winding and the second secondary winding are positioned on the second magnetic column.

18. The full-wave rectifier converter of claim 12, wherein each of the first secondary winding and the second secondary winding comprises an outlet end and a connecting end, wherein an end of the inductor winding is coupled to the connecting end of the first secondary winding and the connecting end of the second secondary winding, wherein the connecting ends of the first secondary winding and the second secondary winding are not at the same side where the outlet ends of the first secondary winding and the second secondary winding are positioned.

19. The full-wave rectifier converter of claim 12, wherein the magnetic columns further comprise a fifth magnetic column.

20. The full-wave rectifier converter of claim 12, wherein the second magnetic column or the third magnetic column comprises an air gap.

21. The full-wave rectifier converter of claim 12, wherein the magnetic core further comprises an upper magnetic cover and a lower magnetic cover, wherein the upper magnetic cover, the lower magnetic cover, and the first second, third, and fourth magnetic columns form a closed magnetic circuit.

22. The full-wave rectifier converter of claim 12, wherein both the first secondary winding and the second secondary winding are single-turn windings, and the inductor winding is a double-turn winding.

23. The full-wave rectifier converter of claim 12, wherein the primary winding of the integrated magnetic component is coupled to the primary switch unit, and the first secondary winding and the second secondary winding of the integrated magnetic component are coupled to the secondary rectifying unit, wherein an end of the inductor winding of the integrated magnetic component is coupled to the connection where the first secondary winding and the second secondary winding couple to each other, and another end of the inductor winding of the integrated magnetic component is coupled to the filter element.

24. The full-wave rectifier converter of claim 12, wherein the primary switch unit is a full-bridge converter, a half-bridge converter or a push-pull converter.

25. The full-wave rectifier converter of claim 12, wherein the secondary rectifying unit comprises a plurality of diodes or a plurality of synchronous rectifiers.

26. The full-wave rectifier converter of claim 12, wherein the inductor winding and the filter element form an output filtering unit.

* * * * *